United States Patent
Alvarez Ruiz et al.

(10) Patent No.: US 9,636,979 B1
(45) Date of Patent: May 2, 2017

(54) VEHICLE FRAME STRUCTURE

(71) Applicant: FORD GLOBAL TECHNOLOGIES, LLC, Dearborn, MI (US)

(72) Inventors: Ezequiel Alvarez Ruiz, Mexico City (MX); Cynthia Wetzel, Dearborn, MI (US); Siavash Osooli, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/971,369

(22) Filed: Dec. 16, 2015

(51) Int. Cl.
*B62D 65/06* (2006.01)
*B60J 5/10* (2006.01)

(52) U.S. Cl.
CPC ............. *B60J 5/107* (2013.01); *B62D 65/06* (2013.01)

(58) Field of Classification Search
CPC .................................. B60J 5/107; B62D 65/06
USPC ....................................................... 296/146.6
See application file for complete search history.

(56) References Cited

U.S. PATENT DOCUMENTS

| 7,503,619 B2 | 3/2009 | Werner |
| 8,746,777 B2 * | 6/2014 | Iwano ...................... B60J 5/101 296/146.11 |
| 8,899,658 B1 | 12/2014 | Gangal et al. |
| 2014/0203591 A1 * | 7/2014 | Lathwesen ............... B60J 5/107 296/146.8 |

FOREIGN PATENT DOCUMENTS

| DE | 102008031124 A1 | 1/2010 | |
| DE | 102012008561 B4 | 5/2014 | |
| EP | 3002144 A1 * | 4/2016 | ............. B60J 5/107 |

* cited by examiner

*Primary Examiner* — Pinel Romain
(74) *Attorney, Agent, or Firm* — Jason C. Rogers; Brooks Kushman P.C.

(57) ABSTRACT

A vehicle includes a cross-member and a hinge. The cross-member has a horizontal surface converging with a vertical surface. The vertical surface has a generally flat profile and defines at least one curved recess proximate to a hinge support area located on the horizontal surface. The cross-member has a yield strength that is greater proximate to the curved recess relative to the remaining generally flat profile. The hinge is secured to the hinge support area.

20 Claims, 3 Drawing Sheets

VEHICLE FRAME STRUCTURE

TECHNICAL FIELD

The present disclosure relates to components of vehicle frames that are configured to provide structural support to vehicle doors, liftgates, hatchbacks, etc.

BACKGROUND

Deformation in the components of a vehicle frame may lead to lead to misalignment of vehicle doors, liftgates, hatchbacks, etc.

SUMMARY

A vehicle includes a cross-member and a hinge. The cross-member has a horizontal surface converging with a vertical surface. The vertical surface has a generally flat profile and defines at least one curved recess proximate to a hinge support area located on the horizontal surface. The cross-member has a yield strength that is greater proximate to the curved recess relative to the remaining generally flat profile. The hinge is secured to the hinge support area.

A vehicle includes an upper header having a first surface converging with a second surface. The second surface has a generally flat profile and defines a pair of curved recesses that straddle a hinge support area located on the first surface. The upper header has a yield strength that is greater proximate to the curved recess relative to the remaining generally flat profile.

A method for constructing a vehicle component includes providing a cross-member having a horizontal surface converging with a vertical surface that has a generally flat profile, and defining a pair of curved recess in the vertical surface that straddle a hinge support area located on the horizontal surface.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
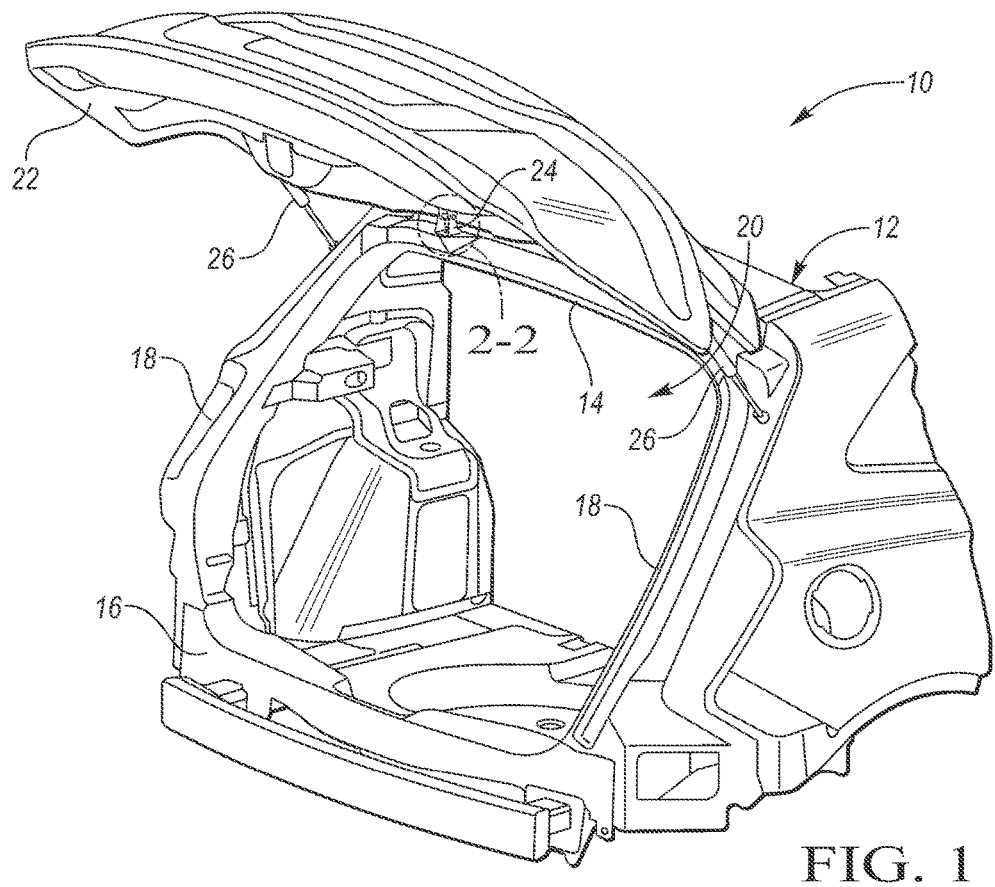
FIG. 1 is a rear perspective view of a vehicle having a liftgate that is in an open position.

Referring to FIG. 1, a rear perspective view of a vehicle 10 is illustrated. The vehicle includes a body frame 12. The body frame 12 may include an upper header 14 that is secured to a lower header 16 by a pair of side members 18 that abridge the space between the upper header 14 and the lower header 16. The upper header 14 and the lower header 16 may also be referred to as cross-members. The upper header 14, lower header 16, and the side members 18 may define an opening 20 that functions as an entry way into the vehicle 10. The opening 20 may be an entry way into a rear storage or trunk area of the vehicle 10. The various components of the body frame 12, including the upper header 14, lower header 16, and side members 18 may consists of sheet metal material that has been formed to the desired shape for each specific component. The sheet metal material that the various components of the body frame 12 may be formed from includes, but is not limited to, steel, aluminum, aluminum alloys, magnesium, and magnesium alloys.

The vehicle 10 may also include a rear door 22 that is configured to transition between an open position to expose the opening 20 and a closed position to conceal the opening 20. The door 22 may be a liftgate or hatchback type of door that pivots upwards into the open position and downwards into the closed position. The door 22 may be pivotally secured to the upper header 14 by a least one hinge 24. The door may be biased in the open position by at least one strut 26. The strut 26 may comprise a hydraulic or gas piston that is slidable within cylinder.

Figure 2:
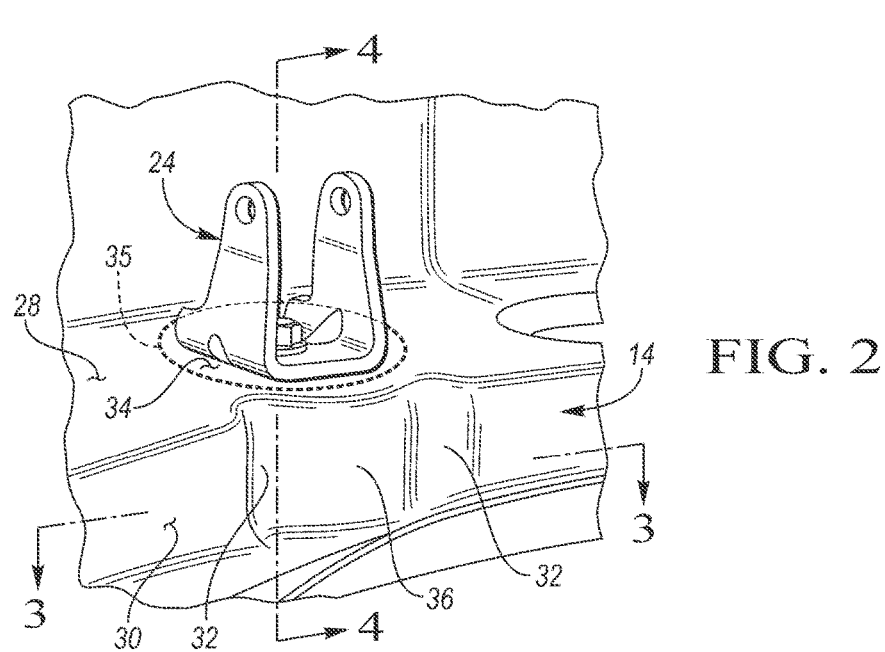
FIG. 2 is an enlarged view of the area encompassed by circle 2-2 shown in FIG. 1.

Referring now to FIG. 2, an enlarged view of the area encompassed by circle 2-2 shown in FIG. 1 is illustrated. A lower portion of the hinge 24 is secured to the upper header 14. The upper header 14 may have a first surface that converges with a second surface. The first surface may comprise a horizontally extending surface 28 while the second surface may comprise a vertically extending surface 30. The majority of the vertically extending surface 30 may have a generally flat profile. The generally flat profile of the majority of the vertically extending surface 30 may extend along a two dimensional geometric plane with minimal or negligible deviation from the two dimensional plane. For example, the minimal deviation of the generally flat profile from the two dimensional geometric plane may be up to 5 mm. The two dimensional plane may be flat or may include some curvature. The vertically extending surface 30, however, may define at least one curved recess 32 that protrudes inward from and deviates from the generally flat profile. The at least one curved recess 32 may be defined by the vertically extending surface 30 proximate to a hinge support area 34 located on the horizontally extending surface 28. The hinge support area 34 may comprise the area of the horizontally extending surface 28 upon which the hinge 24 is secured plus an additional area of the horizontally extending surface 28 that is proximate to the hinge 24. For example, the hinge support area 34 may be the area encompassed within the circle 35 depicted in FIG. 2. The hinge support area 34 may experience loading forces caused by the weight of the door (especially when in the open position) and the biasing characteristics of the struts 26. The loading forces may lead to deformation of the upper header 14 within the hinge support area 34, which in turn may lead to misalignment of the door 22 relative to the opening 20. The deviation from the generally flat profile of the vertically extending surface 30 caused by the at least one curved recess 32 increases the yield strength of the upper header 14 in and proximate to the hinge support area 34 relative to the remainder of the upper header 14 where the vertically extending surface 30 maintains the generally flat profile.

More specifically, the vertically extending surface 30 may define a pair of curved recesses 32. The pair of curved recesses 32 may straddle or flank the hinge support area 34 such that the hinge 24 is disposed between the pair of curved recesses 32. The pair of curved recesses 32 may converge into a curved projection 36. The curved projection 36 may partially define the hinge support area 34 on the horizontally extending surface 28.

Figure 3:
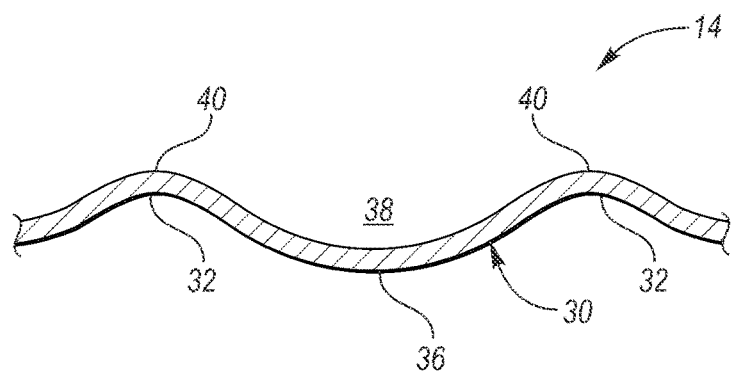
FIG. 3 is a cross-sectional view taken along line 3-3 in FIG. 2.

Referring to FIG. 3, a cross-section of the upper header 14 taken along line 3-3 in FIG. 2 is illustrated. The vertically extending surface 30 of the header is shown to be a sheet material. The curved recesses 32 are shown to protrude inward and into the header 14, while the curved projection 36 is shown to extend outward and away from the header 14. Internally extending curved projections 40 extend into the upper header 14 opposite of the curved recesses 32. The curved projection 36 partially defines a curved cavity 38 that is located below the horizontally extending surface 28 (which is shown in FIG. 4).

Figure 4:
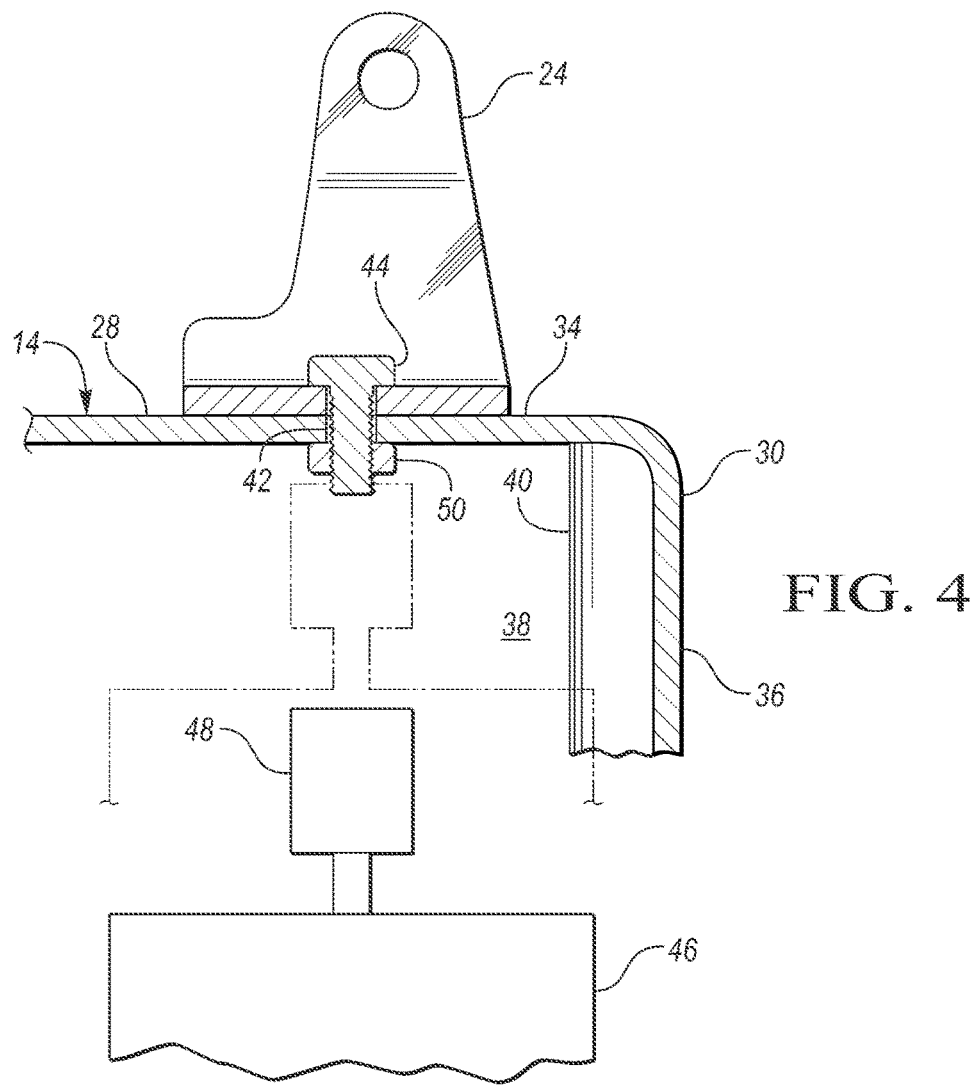
FIG. 4 is a cross-sectional view taken along line 4-4 in FIG. 2.

Referring to FIG. 4, a cross-section of the upper header 14 and lower portion of the hinge 24 taken along line 4-4 in FIG. 2 is illustrated. The hinge support area 34 of the horizontally extending surface 28 may define an aperture 42 that is configured to receive a fastener 44. The fastener 44 may engage the hinge 24, pass through the aperture 42, and engage the upper header 14 to secure the hinge 24 to the horizontally extending surface 28. The cavity 38 partially defined by the curved projection 36 may be sized to receive and provide clearance for a hinge attachment tool 46. In the depicted embodiment, the hinge attachment tool 46 is shown to a be a nutrunner that includes a socket 48 that is configured to secured a nut 50 to the fastener 44 (which is a bolt in the depicted embodiment). It should be understood, however, that the fastener may be any type of fastener 44 that is capable of securing the hinge 24 to the upper header 14 while the hinge attachment tool 46 may be a particular type of tool configured to engage a particular type of fastener. For example, the fastener 44 may be a rivet and the hinge attachment tool 46 may be a rivet gun.

Alternatively, the hinge 24 may be attached to the upper header 14 without a fastener. For example, the hinge may be attached to the hinge support area 34 of the horizontally extending surface 28 by a clinching process or welding process, while the hinge attachment tool 46 may respectively be a clinching tool or a welder.

Figure 5:
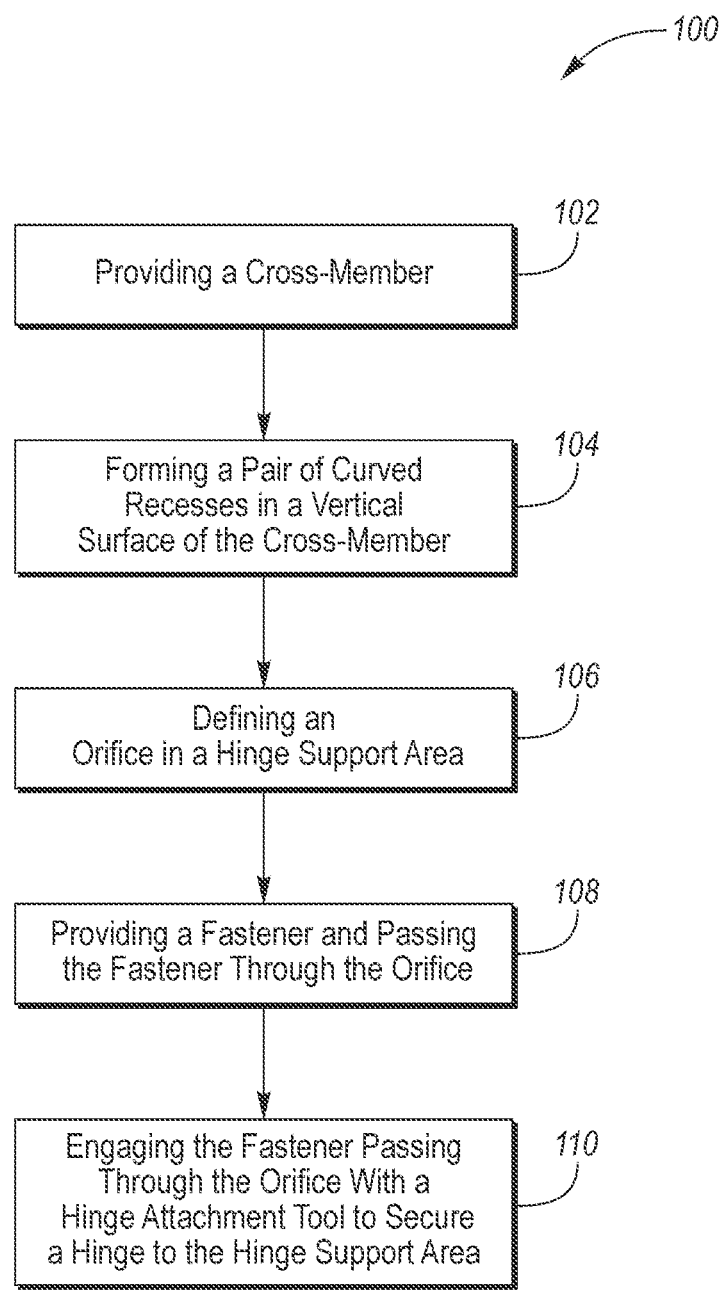
FIG. 5 is a flowchart illustrating a method for constructing a vehicle frame component.

Referring to FIG. 5, a flowchart illustrating a method 100 for constructing a vehicle frame component is illustrated. At the first step 102, the method 100 includes providing a cross-member. The cross-member has a horizontal surface that converges with a vertical surface. The vertical surface may have a generally flat profile. Next, the method 100 moves on to step 104.

At step 104, a pair of curved recesses is defined in the vertical surface of the cross-member. The pair of curved recesses may straddle or flank a hinge support area that is located on the horizontal surface of the cross-member. The pair of curved recesses may converge into curved projection. The curved projection may partially define the hinge support area of the horizontal surface. The curved projection may also partially define a curved cavity below the horizontal surface that is sized to receive a hinge attachment tool.

Once the pair of curved recesses has been defined in the vertical surface, the method 100 moves on to step 106. At step 106, an aperture is defined in the hinge support area of the horizontal surface. The aperture may be sized to receive a fastener that is configured to engage the aperture and a hinge in order to secure the hinge to the hinge support area of the horizontal surface.

Next, the method 100 moves on to step 108 where a fastener is provided and the fastener is passed through the aperture. Once the fastener is passed through the aperture, the method 100 moves on to step 110 where a hinge attachment tool engages the fastener to secure a hinge to the hinge support area of the horizontal surface.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a cross-member having a horizontal surface converging with a vertical surface, the vertical surface having a generally flat profile and defining at least one curved recess proximate to a hinge support area located on the horizontal surface, the cross-member having a yield strength that is greater proximate to the curved recess relative to the remaining generally flat profile; and
a hinge secured to the hinge support area.

2. The vehicle of claim 1, wherein the at least one curved recess comprises a pair of curved recesses and the hinge is disposed between the pair of curved recesses.

3. The vehicle of claim 2, wherein the pair of curved recesses converge into a curved projection.

4. The vehicle of claim 3, wherein the curved projection partially defines the hinge support area on the horizontal surface.

5. The vehicle of claim 4, wherein the hinge support area defines an aperture and a fastener is configured to pass through the aperture to secure the hinge to the horizontal surface of the cross-member.

6. The vehicle of claim 4, wherein the curved projection partially defines a curved cavity sized to receive a hinge attachment tool.

7. The vehicle of claim 1, wherein the cross-member is a sheet metal material.

8. A vehicle comprising:
an upper header having a first surface converging with a second surface, the second surface having a generally flat profile and defining a pair of curved recesses that straddle a hinge support area located on the first surface, the upper header having a yield strength that is greater proximate to the curved recesses relative to the remaining generally flat profile.

9. The vehicle of claim 8, wherein the pair of curved recesses converge into a curved projection.

10. The vehicle of claim 9, wherein the curved projection partially defines the hinge support area on the first surface.

11. The vehicle of claim 10, wherein the hinge support area defines an aperture and a fastener is configured to pass through the aperture to secure the hinge to the first surface of the upper header.

12. The vehicle of claim 11, wherein the curved projection partially defines a curved cavity sized to receive a hinge attachment tool.

13. The vehicle of claim 8, wherein the upper header is a sheet metal material.

14. The vehicle of claim 8, further comprising a hinge secured to the hinge support area.

15. The vehicle of claim 8, wherein the first surface extends horizontally and the second surface extends vertically.

16. A method for constructing a vehicle frame component comprising:
   providing a cross-member having a horizontal surface converging with a vertical surface, the vertical surface having a generally flat profile; and
   forming a pair of curved recesses in the vertical surface that straddle a hinge support area located on the horizontal surface.

17. The method of claim 16, wherein the pair of curved recesses converge into a curved projection that partially defines the hinge support area.

18. The method of claim 17, wherein the hinge support area defines an aperture.

19. The method of claim 18, wherein the curved projection partially defines a curved cavity sized to receive a hinge attachment tool.

20. The method of claim 19, further comprising the steps of:
   providing a fastener;
   passing the fastener through the aperture;
   engaging the fastener passing through the aperture with the hinge attachment tool; and
   securing a hinge to the hinge support area with the fastener.

* * * * *